(12) United States Patent
Mondry et al.

(10) Patent No.: US 7,573,486 B2
(45) Date of Patent: Aug. 11, 2009

(54) METHOD AND SYSTEM FOR AUTOMATIC GENERATION OF IMAGE DISTRIBUTIONS

(75) Inventors: A. Michael Mondry, Quebec (CA); Michael Chilton Sheasby, Quebec (CA); Luis Fernando Talavera Abdala, St. Cloud (MX)

(73) Assignee: LumaPix Inc., Quebec (CA)

( * ) Notice: Subject to any disclaimer, the term of this patent is extended or adjusted under 35 U.S.C. 154(b) by 298 days.

(21) Appl. No.: 10/900,442

(22) Filed: Jul. 28, 2004

(65) Prior Publication Data

US 2005/0044485 A1    Feb. 24, 2005

(51) Int. Cl.
*G09G 5/00* (2006.01)
*G06F 17/00* (2006.01)
*G06F 3/048* (2006.01)

(52) U.S. Cl. .................. 345/619; 345/629; 715/788; 715/244; 715/247

(58) Field of Classification Search ............. 345/428, 345/619, 418, 629, 419; 715/517, 788, 202, 715/244, 247, 764, 765, 789; 348/441
See application file for complete search history.

(56) References Cited

U.S. PATENT DOCUMENTS

| | | | | |
|---|---|---|---|---|
| 6,259,457 | B1 * | 7/2001 | Davies et al. | 345/629 |
| 6,453,078 | B2 * | 9/2002 | Bubie et al. | 715/517 |
| 6,888,543 | B2 * | 5/2005 | Ingber et al. | 715/788 |
| 2003/0160824 | A1 * | 8/2003 | Szumla | 345/769 |
| 2004/0080670 | A1 * | 4/2004 | Cheatle | 348/441 |
| 2004/0122806 | A1 * | 6/2004 | Sang et al. | 707/3 |
| 2004/0150657 | A1 * | 8/2004 | Wittenburg et al. | 345/619 |
| 2005/0210414 | A1 * | 9/2005 | Angiulo et al. | 715/838 |
| 2006/0109283 | A1 * | 5/2006 | Shipman et al. | 345/629 |
| 2006/0176305 | A1 * | 8/2006 | Arcas et al. | 345/428 |

* cited by examiner

*Primary Examiner*—Chante Harrison
(74) *Attorney, Agent, or Firm*—Fish & Richardson P.C.

(57) ABSTRACT

A method and system for automatically producing arrangements of two-dimensional extents in a computer-based editing or animation environment is presented. The method consists of defining a set of objects having two or more dimensions, automatically calculating and presenting an arrangement of said objects, and optionally iterating to produce alternative arrangements. The arrangements may use templates to guide the selection of sizes, border colors and transparency, rotation, and other attributes of the contained regions.

25 Claims, 5 Drawing Sheets

VARIATIONS ON A COLLAGE

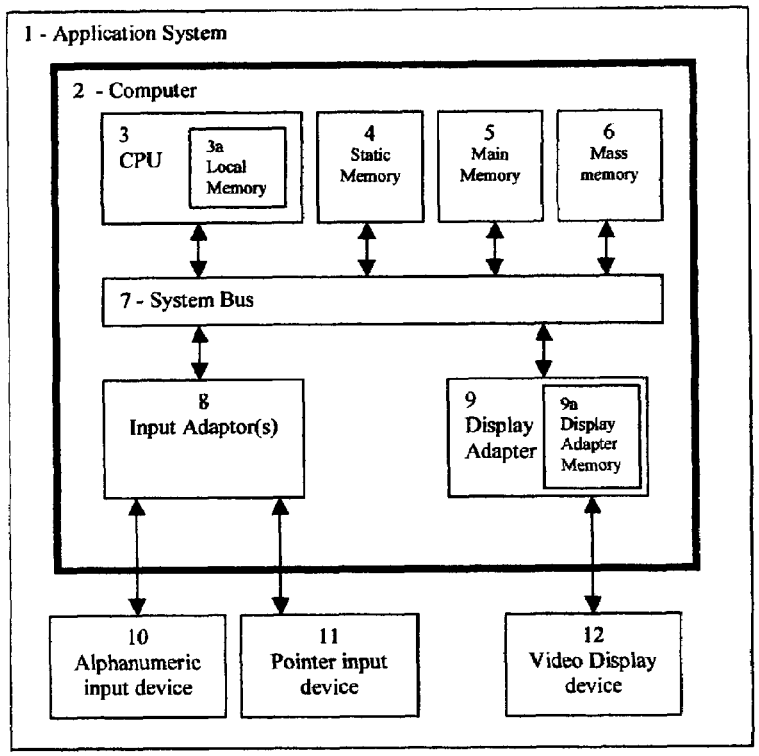
Figure 1a: Computer System
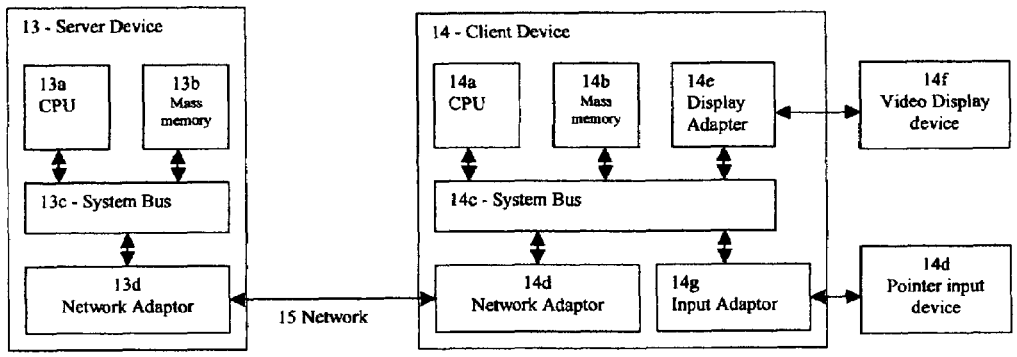
FIGURE 1B: COMPUTER NETWORK

FIGURE 2: SAMPLE USER INTERFACE
FIGURE 3: WORKFLOW
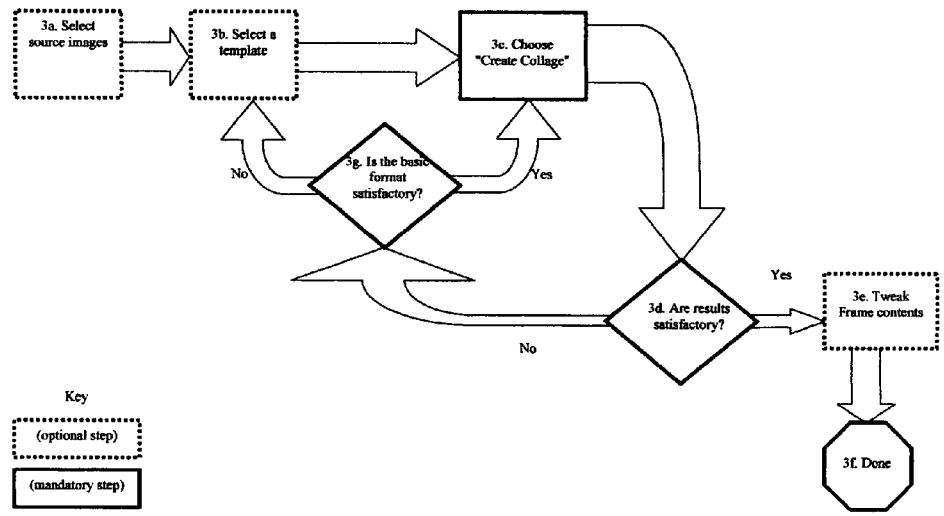

FIGURE 4: COLLAGE STYLES
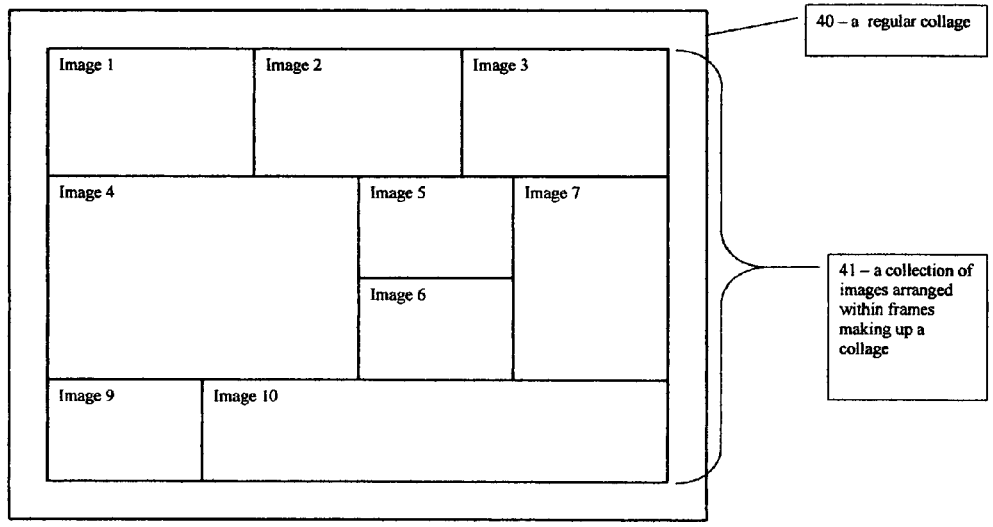
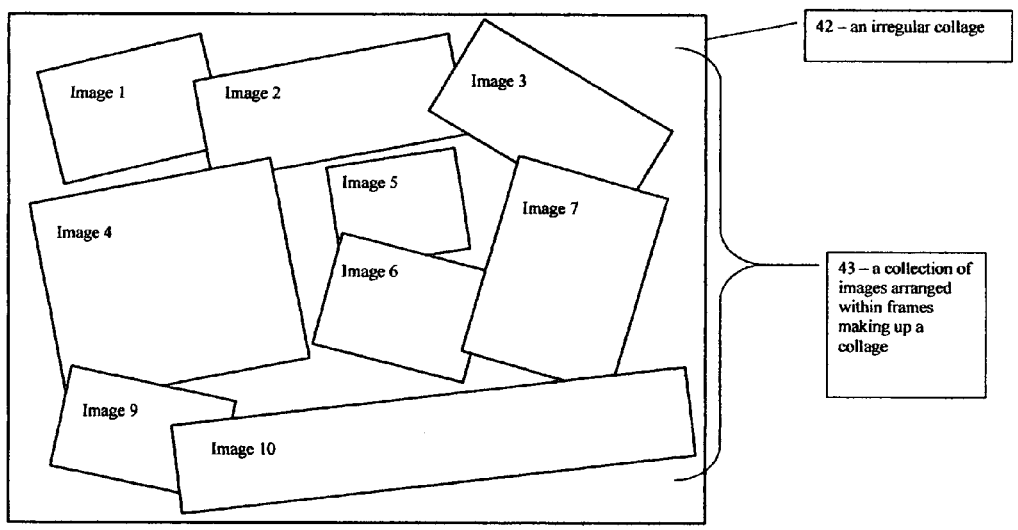

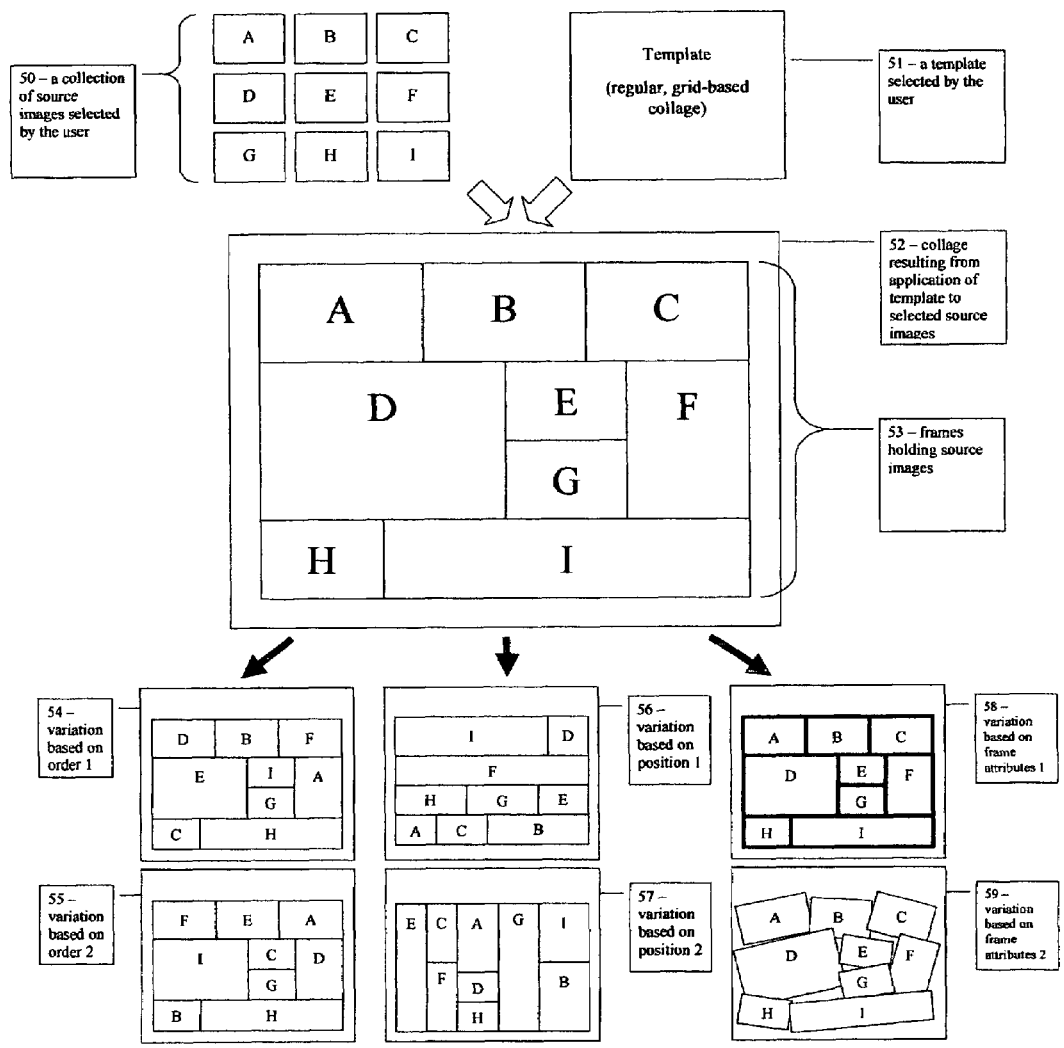
FIGURE 5: VARIATIONS ON A COLLAGE

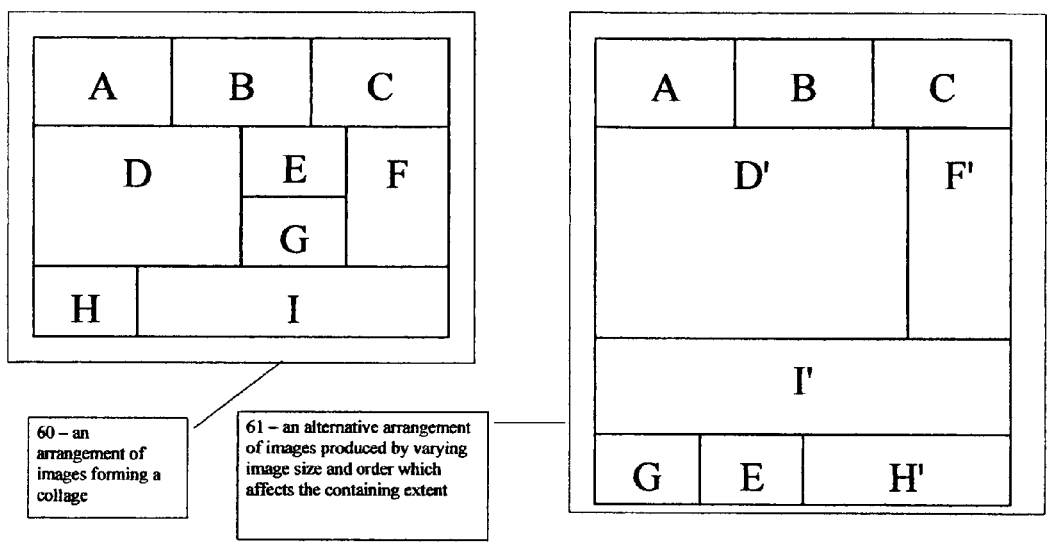
Figure 6: Effect of alternative arrangement upon extent of collage

METHOD AND SYSTEM FOR AUTOMATIC GENERATION OF IMAGE DISTRIBUTIONS

CROSS-REFERENCE TO RELATED APPLICATIONS

| Appl. # | Title | Relationship |
|---|---|---|
| 60/446751 | Method and System for interactive 2D region segmentation | Regions of a composition generated by the current invention can be further subdivided using the methods taught in said related application. |
| 60/469,873 | Method and system for multipage print layout | Compositions generated by the current invention can be subdivided for printing using the methods in said related application. |
| 60/446,752 | Method and system for distributing multiple dragged objects | Regions of a composition generated by the current invention can be populated with data using the methods taught in said related application. |
| 60/446,757 | Method and system for interactive cropping of a graphical object within a containing region | Regions of a composition generated by the current invention can be cropped using the methods taught in said related application. |

FIELD OF THE INVENTION

The present invention relates to computer-based editing systems and methods. More particularly, the present invention relates to a method and system for the automatic creation of arrangements of two-dimensional data, such as images within a collage.

BACKGROUND OF THE INVENTION

Digital imaging systems enable the user to manipulate images such as those captured by a digital camera, scanned from paper originals, or generated by other digital imaging software systems. One such operation involves assembling multiple images into a single larger image, forming a "collage", or an arrangement of images which is itself an image. Software tools, such as the LumaPix::FotoFusion™ software application published by LumaPix, simplify the creation of collages with tools that enable the user to position, resize, and interactively crop images in order to generate the larger collage.

To create a collage, the user typically selects images from a repository, then brings them onto a collage surface, or "Canvas", where further editing (such as rotating, mirroring, or resizing member images) is possible. The act of producing the collage may be aided by tools such as the subdivision of the canvas into smaller, aligned frames. In many cases the user must manually populate the empty frames with images from the repository. In other prior art, there exist "templates", or pre-defined arrangements of frames within canvases, which can be populated with a selected set of images with a single action by the user. While this technique requires less work of the user than manual placement, it also restricts the variety of collage compositions to only those alternatives made possible by re-ordering the insertion of selected images into pre-arranged frames in the template; the overall structure of the generated collage remains identical to the template collage. While this uniformity may be desirable for certain applications, the results become monotonous for other applications where variety and uniqueness are appreciated. Novel collage layouts retain visual interest, a desirable trait when viewing collections of collages.

It is therefore desirable to provide a method and system for producing two-dimensional arrangements that obviates or mitigates the disadvantages of the prior art. In particular, it is desirable to provide a method and system for automatically generating unique arrangements of images, ideally with the ability to produce novel varieties of arrangements that have been "inspired" by a selected template layout.

SUMMARY OF THE INVENTION

According to a first aspect of the present invention, there is provided a method for editing an arrangement of objects in a computer-based editing system, comprising the steps of:
a) Defining a set of objects to be arranged, each object member of said set specifying an extent in at least two dimensions
b) Automatically calculating and presenting an arrangement of said set of objects within an extent of at least two dimensions such that said arrangement of said objects fills said extent, cropping said images as necessary to allow uniform spacing if desired.
c) Optionally, automatically calculating and presenting alternative arrangements of said set of objects.

According to a further aspect of the present invention, there is provided a method wherein the user selects a template arrangement determining a set of attributes to be used in the calculation of a new arrangement. The attributes specified by this template may include region border width and/or color and/or transparency and/or texture and/or rotation and/or size distribution.

BRIEF DESCRIPTION OF THE DRAWINGS

Preferred embodiments of the present invention will now be described, by way of example only, with reference to the attached Figures, wherein:

FIG. 1a is a schematic of an editing system operating on a single computing device according to an embodiment of the present invention;

FIG. 1b is a schematic of an editing system operating on a client-server basis in a networked system of computing devices according to an embodiment of the present invention;

FIG. 2 illustrates the user interface of a preferred embodiment of the present invention FIG. 3 is a flow chart of a method according to an embodiment of the present invention;

FIG. 4 illustrates two alternative styles of collages, or arrangements of data objects exposing a two-dimensional extent: a regular, or aligned collage, and an irregular, or free-floating collage.

FIG. 5 illustrates various techniques for producing alternative arrangements of a given collage, including varying data object order, varying data object size and position, and varying attributes (such as color or thickness) of the frames enclosing the data objects.

FIG. 6 illustrates a resizing of the overall collage extent forced by the variation of the size and position of data objects contained within that collage.

DETAILED DESCRIPTION

The present invention provides a system and method for editing digital information. In the following discussion, the present invention is described for illustrative purposes with reference to the manipulation of raster image information.

However, one of ordinary skill in the art will recognize that the invention, in its broadest aspect, is applicable to applications other than image applications, and it is not intended that the scope of the invention be so limited.

Computer Imaging System

A computer-based system 1 suitable for use of this invention is schematically depicted in FIG. 1*a*. The application system 1 includes a computer 2 that has a central processing unit (CPU) 3 which may include local memory 3*a*, static memory 4 such as Read-only memory (ROM), main memory 5 such as Random Access memory (RAM), mass memory 6 such as a computer disk drive, a system bus 7, adaptor(s) for external input devices 8, and a display adapter 9 which may include local memory 9*a*. The computer 2 communicates with an alphanumeric input device 10 such as a keyboard, a pointing device 11 such as a mouse for manipulating a cursor and making selections of data via said input adapter 8. The computer 2 communicates with a video display 12 such as a computer monitor via said display adapter 9.

The computer 2 may execute software such as the imaging system described below to allow the system 1 to render high quality graphics images on the monitor 12. The CPU 3 comprises a suitable processing device such as a microprocessor, for example, and may comprise a plurality of suitable processing devices. The graphics adaptor 9 may also be capable of executing instructions. Instructions are stored in the CPU local memory 3*a*, static memory 4, display adapter local memory 9*a*, main memory 5, and/or mass memory 6 and are executed by the CPU 3 or the display adapter 9.

The static memory 4 may comprise read only memory (ROM) or any other suitable memory device. The local memory may store, for example, a boot program for execution by CPU 3 to initialize the graphics imaging system 1. The main memory 5 may comprise random access memory (RAM) or any other suitable memory device. The mass memory 6 may include a hard disk device, a floppy disk, an optical disk, a flash memory device, a CDROM, a file server device or any other suitable memory device. For this detailed description, the term memory comprises a single memory device and any combination of suitable devices for the storage of data and instructions.

The system bus 7 provides for the transfer of digital information between the hardware devices of the system 1. The CPU 3 also receives data over the system bus 7 that is input by a user through alphanumeric input device 10 and/or the pointer device 11 via an input adaptor 8. The alphanumeric input device 10 may comprise a keyboard, for example, that comprises alphanumeric keys. The alphanumeric input device 10 may comprise other suitable keys such as function keys for example. The pointer device 11 may comprise a mouse, track-ball, tablet and/or joystick, for example, for controlling the movement of a cursor displayed on the computer display 12.

The system 1 of FIG. 1*a* also includes display adapter hardware 9 that may be implemented as a circuit that interfaces with system bus 7 for facilitating rendering of images on the computer display 12. The display adapter hardware 9 may, for example, be implemented with a special graphics processor printed circuit board including dedicated random access memory 9*a* that helps speed the rendering of high resolution, color images on a viewing screen of the display 12.

The display 12 may comprise a cathode ray tube (CRT) or a liquid crystal display particularly suited for displaying graphics on its viewing screen. The invention can be implemented using high-speed graphics workstations as well as personal computers having one or more high-speed processors.

In the preferred embodiment of the invention, the system 1 utilizes specialized graphics software which implements a user interface and related processing algorithms as described in subsequent sections to enable the user to produce works viewed on the display 12 and which may be stored in mass memory 6.

With reference to FIG. 1*b*, the system may also operate in a networked environment of multiple computing devices. Specifically the system may perform certain calculations on a server device 13, which communicates via a network adaptor 13*d* with a client device 14 which itself includes a network adaptor 14*d*. The communication between client and server enables the method of the current application to be executed in a distributed fashion, with flexibility as to which of the two devices performs each step as will be described in further detail below.

Employing system 1, a collage or other digitally edited representation of multiple source data can be composed and edited. FIG. 2 shows a typical graphical user interface employed by a user to create and edit a composition. Embodiments of the present invention will be described with reference to the illustrated LumaPix::FotoFusion™ interface. However, as will be apparent from the following description, the present invention is not limited to any particular user interface or application software package, and can be used in any system enabling the assembly of compositions of multiple source data objects exposing two-dimensional extents.

In some examples of prior art, assembling collages is achieved by manually adding images to a workspace in an iterative fashion. The workspace may have been pre-configured with a set of frames which accept the images into pre-defined positions and sizes, thereby accelerating the process of arranging the collage; this set of pre-configured frames is herein referred to as a 'template'. A collection of templates may expose a variety of border styles (for example, blurred edges versus hard edges, blue versus red color borders around the images); however, in prior art the primary purpose of each template is to provide a set of fixed 'pigeonholes' which determine how a user-specified set of pictures will be arranged, thus reducing the amount of manual work required by the user.

In prior art, using a template with a set of selected pictures determines the size and position of each image in the resulting collage, with the end product matching the template layout precisely. In particular, should a template contain sufficient frames to hold ten images, then prior art methods may respond to attempts by the user to insert twelve images by creating an additional instance of the ten-image collage to hold the two extra images, or by reducing the list of source images by two images by some automated criteria or user intervention and continuing with ten images.

The method and system of the present invention improve upon this static definition of a template, in that the template instead defines guidelines for the production of a final collage which may contain any number of source images. The template may additionally include attributes such as border color and style, which are used as guidelines for the creation of variations upon a theme as opposed to exact duplicates of the template styles. Importantly, the user has the ability to iteratively generate new collages based upon a selected template and set of source images; the user can choose a favorite result from within the generated series of unique compositions, which vary within ranges allowed by the template.

In other prior art, software tools exist to optimize the use of wide-format paper when outputting multiple "jobs" to a printer, arranging those unrelated jobs (such as photos or text documents) to fit side-by-side on the printed output as opposed to beside one another (thus leaving less paper blank and wasted). Each of the documents to be printed must be printed at an exact size (number of square inches) and resolution (dots per inch) and without any modification to the document (e.g. cropping part of the image away to fit a space). As a result, the prior art produces a "best fit of images without affecting those images".

The method and system of the present invention improve differ from that automatic printed document arrangement functionality by allowing cropping and scaling of the source images to take place. This allows the user to create compositions of interesting arrangements of images that appear evenly laid out, with uniform distances between all edges of all images in the collage. This effect is not possible unless the program is allowed to crop images to fit. The prior art for printing layout is a technical process designed to optimize paper usage; the current invention is an layout tool designed to present images in an aesthetic manner. The prior art must not affect the source images in any way; the current invention may crop and scale images as required to accomplish the goal of a uniformly-spaced layout.

The method of the present invention will be described with reference to the flow chart shown in FIG. 3.

The method of the present invention commences at step 3a, by selecting a set of images, with no bounds on the number of images in that set. As will be easily conceived by one of skill in the art, selection may take place via browsing the file system, conducting searches for suitable data objects, referring to a database of data objects, or other techniques. Alternatively, in this step, the user may elect to merely specify a number of frames as opposed to the specific images that will fill those frames. This enables the user to generate an 'empty' collage, ready for the introduction of images at a later time if this is desirable. In another alternative, the user may skip step 3a and proceed to step 3b, the selection of a template, which may suggest a number of empty frames in the absence of a number specified by the user.

The method proceeds to step 3b, where in a preferred embodiment the user selects a template from a library of available templates; the library contains "styles" such as those shown in FIG. 4, where by way of example one template produces a 'regular' collage 40 (a grid-like arrangement where frames 41 do not overlap and have no rotation) and a second template produces a 'free-form' collage 42 (in which frames 43 can be rotated to any angle and empty space can exist between images). If the user chooses not to select a template, a default template may be employed. Step 3b is itself optional, as the user may choose to simply apply an 'autocollage' tool, which uses the steps in the current invention to create an automatic layout to fill dimensions specified by the user.

The method proceeds to step 3c, in which the user clicks a button 20 or otherwise indicates his desire to create an arrangement automatically. The system 1 responds by producing a collage in the style of the currently selected template, in a method described more fully in a subsequent section, and displaying it to the user for consideration.

In step 3d, the user evaluates the automatically-generated collage for suitability. If it is unacceptable deficient under some criteria, the user may elect to regenerate a new collage using the same template (which in the current invention will produce a unique new arrangement with the same visual character as the current template) or alternatively to select a different template entirely.

The ability to generate a novel arrangement at this step 3c in the method is unique among current art; indeed, because in existing art the generation of arrangements from a template in current art involves copying the arrangement and frame attributes from the template directly into the final collage, there is often no need in existing art for the option to regenerate the collage as this would produce identical results to the extant collage. In contrast, a user of the current invention can continue to request alternative arrangements and see a stream of unique variations upon the theme proposed by the initial collage.

Continuing to step 3e, the user may elect to apply additional editing tools to modify the automatically-generated collage. Various techniques for accelerating the positioning of images within frames, and the subdivision of frames to hold additional images, are described in commonly assigned U.S. Patent Application entitled "METHOD AND SYSTEM FOR INTERACTIVE 2D REGION SEGMENTATION", USPTO application number 60/446,751, the contents of which are incorporated herein by reference.

At step 3f, the user is satisfied with his composition and the process completes.

Alternatively, if at step 3d the user is not satisfied with some aspect of the arrangement of his collage, the method proceeds to step 3g in which the user determines whether the attributes of the template are acceptable but the specific arrangement is not (in which case the user proceeds to step 3c), or the attributes of the collage itself are unacceptable (leading to the selection of a different template in step 3b).

Finally, it is important to note that the user can add new images to the collage or remove existing images from the collage at any point through this process; for example, the user can choose to add three images to a collage already holding 10 frames to produce a new collage with 13 frames.

The method of the present invention will now be described in greater detail with reference to FIG. 5.

The user selects a set 50 of source images from storage, in this diagram by way of example a set of nine images labeled A through I. Note that the user may also elect to simply specify a number of images for the collage, which will be created with empty placeholder frames that can be filled in at a later time. The user also selects a template 51, in this diagram by way of example a template that produces regular, or grid-based, arrangements of images. Note also that the system 1 may provide a default template, removing the requirement for the user to manually specify a template at this step.

The system 1 automatically generates a collage 52 which has the following properties:

- It is composed of a set of frames 53, each capable of holding an image from the set of source images 50.
- The set of frames 53 is of the same size as the same as the set of source images 50 selected by the user (in this case 9 frames), unless the template includes an upper bound on the number of frames a generated collage may contain (in which case the system 1 may generate one or multiple additional instances of the collage 52 as required)
- The frames 53 are filled with the images A-I selected by the user 50
- The arrangement of the frames 53 within the collage 52 and the attributes of those frames are within a threshold of the values, or within the range of values specified by, the template 51 selected by the user.

At this or any subsequent moment the user may elect to re-generate the collage; in the preferred embodiment of the invention, he may indicate this choice by clicking on a button 20 with the pointing device 11 or a similar contrivance.

When the user so triggers a re-arrangement of the collage, the results are generated by the system 1 in such a manner that the newly-generated collage 54-59 vary from the original 52 in some manner determined by the template 51, including by way of example, Variations (54, 55) in the order of image insertions into the frames of the collage 52, such that the order of the displayed images 50 but no other aspect of the collage is affected Variations (56, 57) in the position and size of frames holding the source images 50

Variations (58) in the width, color, transparency, and/or ornamentation of the frames holding each source image 50.

Variations (59) in the rotation of the frames holding each source image 50.

With respect to variations in frame size, the template 51 may support specification of a fixed size (which would result in collages with evenly-sized frames, and a rectangular matrix of equally-sized frames if the template additionally restricts rotation to zero and arrangements to non-overlapping).

Additionally, the template may support specification of a distribution of sizes; for example, a template may specify that 20% of the frames in the resulting collage are four times the size of the smallest, and that 20% of the frames are twice the size of the smallest.

Variations of parameters exposed by the template may be computed by a variety of methods, including:

direct copying of a single value included in the template random selection of a value within a bounded range specified by the template, using a uniform distribution or one suggested by the template for that parameter With respect to variations in frame size and position, note that in most cases the overall dimensions of the collage extent 52 remain the same between variations upon the collage; alternatively, the user may enable the resizing of the collage based upon the shape of the images it contains. As illustrated in FIG. 6, an arrangement 60 of a set of image A-I has a particular size (in this case, the width of images A+B+C and the height of images A+D+H). The resizing of images D, F, I and H to form D', F', I' and H' respectively has been allowed to resize the collage to a new dimension 61 (in this case, the width of images A+B+C and the height of images A+D'+I'+G).

Referring once again to FIG. 1b, it is noted that the execution of the method of this invention can be performed in a distributed fashion between a client 14 and at least one server application 13. Making use of such a network may be desirable for several reasons, including:

Application security. By placing the executable code to compute the arrangement of the collage on the server 13, it becomes impossible to create an unauthorized copy of the program (as the user must connect to the server 13 to produce a collage, and unauthorized attempts to connect can be detected and denied).

Efficient use of bandwidth. Consider a user who wishes to create collages from a set of images that are available in advance (for example, producing a visual selection list of items available for sale that are listed in a central database of such items). Working on the Client computer 14, the user can query the server 13 for a collage which is assembled by the server according to the method of this invention; the resulting collage makes much more efficient use of the bandwidth available via the network 15 than would be the case had the server 13 simply returned all available images. In particular, the user can use the collage as a 'table of contents' for selecting higher-bandwidth versions of images available from the server 13. What is unique in this method is the dynamic assembly of the collage by the server 13, based on the unpredictable query he makes of the server's database.

In a networked embodiment of this invention,

A. The code used to generate the arrangement of frames resides on the server 13

B. The parameters of the creation of the collage (the overall size of the collage, the template for its creation, the image format to write the resulting image in) may reside on the server 13 or client 14

C. The images used as sources for the collage may reside on the server 13 or client 14.

The alternatives B and C are independent and result in different uses:

If the parameters reside on the client and the images reside on the server 13, the resulting application allows a user to compose a novel arrangement of images from a database. Examples include the selection of wedding pictures from a web database by a guest at a wedding: the owner of the pictures has a fixed set of images available but cannot predict which pictures a specific guest would be interested in seeing in a collage.

If the parameters and images reside on the client 14, the use of the server to create the collage indicates that the collage generation is a 'web service', in which the user does not have to install the collage-making software on the client machine 14 but simply make use of a service available on the network.

If the parameters reside on the server 13 and the images reside on the client 14, the user has the ability to select local images and have a collage generated and sent via the network which conforms to a style determined by the operator of the web service. As an example, a real estate agent may take pictures of a house and use a server-based collage generation tool to have a collage with a visual style conforming to the format expected by the realty company.

We claim:

1. A computer-implemented method for creating an arrangement of data objects in a computer-based editing system, comprising the steps of:

a. defining a set of objects to be arranged in a display of the computer-based editing system, wherein there is a number of objects in the set;

b. providing a bounding region for said set of objects, said bounding region including a plurality of frames, each frame receiving one object of said set of objects, said bounding region having an overall dimension so that said frames fit within said overall dimension with uniform spacing between the frames;

c. automatically generating a first arrangement of said set of objects within said bounding region, so that each of said objects fills a frame;

d. displaying the first arrangement on a display;

e. offering a user an option to generate a second arrangement; and f. if said user accepts to generate said second arrangement of said set of objects, generating the second arrangement of said set of objects and displaying the second arrangement on the display, where said number of objects remain unchanged and wherein said second arrangement of said set of objects differs from said first arrangement of said set of objects in at least one manner selected from the group consisting of: order of image insertion; position and size of the frames; one or more attributes of the frames and rotation of frames.

2. A computer-implemented method in accordance with claim 1, wherein the data objects comprising the set are two-dimensional images or image sequences.

3. A computer-implemented method in accordance with claim 1, wherein the step of defining the set of objects includes selecting a set of objects from a pre-existing repository of said objects.

4. A method according to claim 3 wherein said pre-existing repository of said objects is a file system.

5. A computer-implemented method in accordance with claim 1, wherein the step of defining the set of objects includes specifying a dimension or range of dimensions representing a range of possible display extents of each said object in said set.

6. A computer-implemented method in accordance with claim 5, wherein the step of defining the dimension or range of dimensions is based on a default value, a set of values, or is randomized.

7. A computer-implemented method in accordance with claim 1, wherein said attributes include sort order, region border width, border insert, color, transparency, texture, rotation, size distribution, border shape or a combination thereof.

8. A computer-implemented method in accordance with claim 1, wherein calculation of said second arrangement varies one or more attributes of the arrangement within a range of a predetermined value for that attribute defined in a template arrangement.

9. A computer-implemented method in accordance with claim 1, wherein said bounding region includes an upper bound upon the number of frames contained within the bounding region.

10. The computer-implemented method of claim 1, wherein calculating said arrangement varies one or more attributes of the arrangement in a random fashion.

11. The computer-implemented method of claim 10, wherein calculating said arrangement varies one or more attributes of the arrangement in a random fashion.

12. The computer-implemented method of claim 1, wherein the user selects a template arrangement determining a set of attributes to be used in calculating a new arrangement.

13. The computer-implemented method of claim 1, wherein objects have attributes that are independent of content of the objects, and wherein matching of an object to a frame is based on matching attributes of the objects to attributes of the frame, without requiring analysis of the content of the object.

14. The computer-implemented method of claim 13, wherein calculating said arrangement varies one or more attributes of the arrangement in a random fashion.

15. The computer-implemented method of claim 13, wherein the user selects a template arrangement determining a set of attributes to be used in calculating a new arrangement.

16. The computer-implemented method of claim 15, wherein calculating said arrangement varies one or more attributes of the arrangement in a random fashion.

17. A computer readable medium having stored thereon a computer program comprising instructions for implementing a method for creating an arrangement of data objects in a computer-based editing system, comprising the steps of:
   a. defining a set of objects to be arranged, wherein there is a number of objects in the set;
   b. providing a bounding region for said set of objects, said bounding region including a plurality of frames, each frame receiving one object of said set of objects, said bounding region having an overall dimension so that said frames fit within said overall dimension with uniform spacing between the frames;
   c. automatically generating a first arrangement of said set of objects within said bounding region, so that each of said objects fills a frame;
   d. displaying the first arrangement on a display;
   e. offering a user an option to generate a second arrangement; and
   f. if said user accepts to generate said second arrangement of said set of objects, generating said second arrangement of said set of objects and displaying the second arrangement on the display, where said number of objects remain unchanged and wherein said second arrangement of said set of objects differs from said first arrangement of said set of objects in at least one manner selected from the group consisting of: order of image insertion; position and size of the frames; one or more attributes of the frames and rotation of frames.

18. The computer readable medium of claim 17, wherein the data objects comprising the set are two-dimensional images or image sequences.

19. The computer readable medium of claim 17, wherein the step of defining the set of objects includes selecting a set of objects from a pre-existing repository of said objects.

20. A computer readable medium according to claim 19, wherein said pre-existing repository of said objects is a file system.

21. The computer readable medium of claim 17, wherein the step of defining the set of objects includes specifying a number representing the number of elements contained within a set of abstract objects, together with a dimension or range of dimensions representing the extent of each said object in said set.

22. The computer readable medium of claim 21, wherein the step of defining the dimension or range of dimensions is based on a default value or set of values.

23. The computer readable medium of claim 17, wherein said attributes include region border width, color, transparency, texture, rotation, size distribution or a combination thereof.

24. The computer readable medium of claim 17, wherein calculation of said second arrangement varies one or more attributes of the arrangement within a range of a predetermined value for that attribute defined in a template arrangement.

25. The computer readable medium of claim 17, wherein said bounding region includes an upper bound upon the number of frames contained within the bounding region.

* * * * *